US012103580B2

(12) United States Patent
Yuan et al.

(10) Patent No.: US 12,103,580 B2
(45) Date of Patent: Oct. 1, 2024

(54) FOLDING HANDLE, FOLDING DEVICE, CHILD STROLLER SEAT AND CHILD STROLLER

(71) Applicant: WONDERLAND SWITZERLAND AG, Steinhausen (CH)

(72) Inventors: Jialiang Yuan, Dongguan (CN); Zhengwen Guo, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/687,041

(22) Filed: Mar. 4, 2022

(65) Prior Publication Data
US 2022/0281506 A1  Sep. 8, 2022

(30) Foreign Application Priority Data

Mar. 5, 2021  (CN) .......................... 202120484889.0

(51) Int. Cl.
*B62B 7/06* (2006.01)
*B62B 5/06* (2006.01)
*B62B 9/20* (2006.01)

(52) U.S. Cl.
CPC .............. *B62B 7/066* (2013.01); *B62B 5/066* (2013.01); *B62B 9/20* (2013.01)

(58) Field of Classification Search
CPC ......... B62B 7/066; B62B 7/142; B62B 7/064; B62B 5/066; B62B 9/20; B62B 9/104; B62B 2205/20; B62B 2205/22; F16F 1/14; F16F 1/48
See application file for complete search history.

(56) References Cited

U.S. PATENT DOCUMENTS

| 6,068,284 | A | 5/2000 | Kakuda | |
| 8,616,647 | B2 * | 12/2013 | Chen | B62B 9/104 280/47.38 |
| 10,150,496 | B2 * | 12/2018 | Oakes | B62B 7/142 |

(Continued)

FOREIGN PATENT DOCUMENTS

| CN | 2199854 Y | 6/1995 |
| CN | 2411038 Y | 12/2000 |

(Continued)

OTHER PUBLICATIONS

Chinese Search Report issued in corresponding Chinese Application No. 202120484889.0, dated Oct. 20, 2021, pp. 1-12.

(Continued)

*Primary Examiner* — Steve Clemmons
(74) *Attorney, Agent, or Firm* — HAUPTMAN HAM, LLP

(57) ABSTRACT

The disclosure provides a folding handle, a folding device, a child stroller seat, and a child stroller. The folding handle includes: a handle body including a pulling part and a shaft part located at an end of the pulling part; a handle connecting member being fixable on the child stroller seat, and the handle body is pivotally connected to the handle connecting member via the shaft part; and an elastic member configured to force the handle body to pivot toward a closed position. The folding handle according to the disclosure can be automatically closed after the child stroller seat is folded, such that the folded child stroller is more neat and aesthetic, and potential dangers are avoided.

19 Claims, 15 Drawing Sheets

(56) References Cited

U.S. PATENT DOCUMENTS

| | | |
|---|---|---|
| 2010/0237590 A1 | 9/2010 | Kane |
| 2012/0126512 A1 | 5/2012 | Kane et al. |

FOREIGN PATENT DOCUMENTS

| | | | |
|---|---|---|---|
| CN | 201457450 U | 5/2010 | |
| CN | 101987027 A | 3/2011 | |
| CN | 103523069 A | 1/2014 | |
| CN | 203485968 U | 3/2014 | |
| CN | 203544082 U | 4/2014 | |
| CN | 102079324 B | 8/2015 | |
| CN | 204998593 U | 1/2016 | |
| CN | 105398481 A | 3/2016 | |
| CN | 105882718 A | 8/2016 | |
| CN | 106828579 A * | 6/2017 | |
| CN | 208842461 U | 5/2019 | |
| CN | 209096798 U * | 7/2019 | ............... B62B 9/12 |
| CN | 110271597 A * | 9/2019 | ............... B62B 7/06 |
| CN | 110371176 A | 10/2019 | |
| CN | 210555076 U | 5/2020 | |
| CN | 111252129 A | 6/2020 | |
| CN | 211543665 U | 9/2020 | |
| CN | 112360252 A | 2/2021 | |
| CN | 212667473 U | 3/2021 | |
| CN | 213138901 U | 5/2021 | |
| KR | 200171570 Y1 * | 3/2000 | |
| TW | I516397 B | 1/2016 | |
| TW | I560091 B | 12/2016 | |
| WO | 2018014437 A1 | 1/2018 | |

OTHER PUBLICATIONS

Taiwanese First Office Action issued in corresponding Taiwanese Application No. TW111108047, dated Nov. 22, 2022, pp. 1-7.
Taiwanese Second Office Action issued in corresponding Taiwanese Application No. TW111108047, dated Apr. 28, 2023, pp. 1-10.
Chinese First Office Action issued in corresponding Chinese Application No. 2021114511888, dated Jan. 12, 2024, pp. 1-8.

* cited by examiner

FOLDING HANDLE, FOLDING DEVICE, CHILD STROLLER SEAT AND CHILD STROLLER

CROSS-REFERENCE TO RELATED APPLICATIONS

This application claims priority to Chinese Application No. 202120484889.0, filed on Mar. 5, 2021, which is incorporated herein by reference in its entirety.

TECHNICAL FIELD

The present disclosure relates to child strollers, and more particularly, to a folding handle, a folding device, a child stroller seat, and a child stroller.

BACKGROUND

As shown in FIG. 1, a child stroller is an indispensable product in the growth process of children. In order to facilitate carrying, it is often necessary to fold the entire stroller body including the child stroller seat 1. Moreover, a folding handle 100 (see FIG. 2) is usually disposed on a top of the backrest of the child stroller seat 1. When the child stroller needs to be folded, the user only needs to pull the folding handle 100, the child stroller seat 1 in an unfolded state can be unlocked and can be folded, and then the entire stroller body may be folded, as shown in FIGS. 3 and 4.

SUMMARY

A folding handle for a child stroller seat is provided. The folding handle includes: a handle body including a pulling part and a shaft part located at an end of the pulling part; a handle connecting member being fixable on the child stroller seat, and the handle body is pivotally connected to the handle connecting member via the shaft part; and an elastic member configured to force the handle body to pivot toward a closed position.

The foregoing and other purposes, features, aspects and advantages of the disclosure will become more apparent from the following detailed description of the disclosure in conjunction with the accompanying drawings.

BRIEF DESCRIPTION OF THE DRAWINGS

The accompanying drawings are included to provide a further understanding of the disclosure, and are incorporated in and constitute a part of this specification. The drawings illustrate embodiments of the disclosure, and are used together with the following description to illustrate the concepts of the disclosure.

In the drawings.

DETAILED DESCRIPTION

Now the disclosure will be described in detail hereinbelow with reference to the accompanying drawings.

As shown in FIGS. 1 to 6, a folding handle 10 of a child stroller seat 1 is arranged on a top of a backrest of the child stroller seat 1, so as to facilitate the user to pull the folding handle 10 in folding the child stroller seat 1. However, the folding handle 10 may also be arranged at other positions on the child stroller seat 1, such as on a side or a lower part of the backrest of the child stroller seat 1, or even can be arranged on a seat part of the child stroller seat 1.

In order to enable the folding handle 10 to be automatically closed after the child stroller seat 1 is folded, the folding handle 10 according to an embodiment of the disclosure includes a handle body 11, a handle connecting member 12 and an elastic member.

Figure 6:
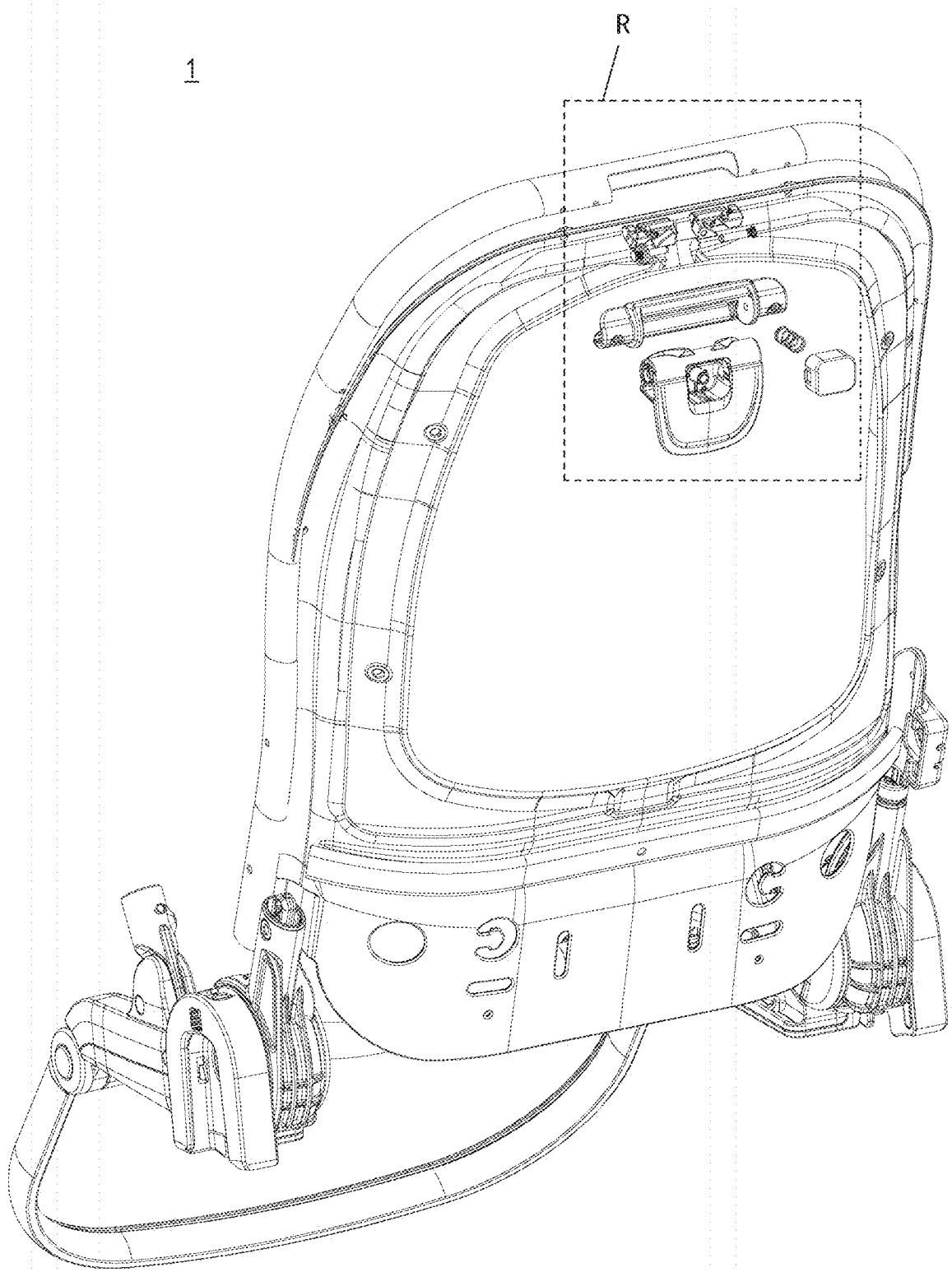
FIG. 6 is a perspective view of a folding handle detached from a child stroller seat according to an embodiment of the disclosure.
Figure 6A:
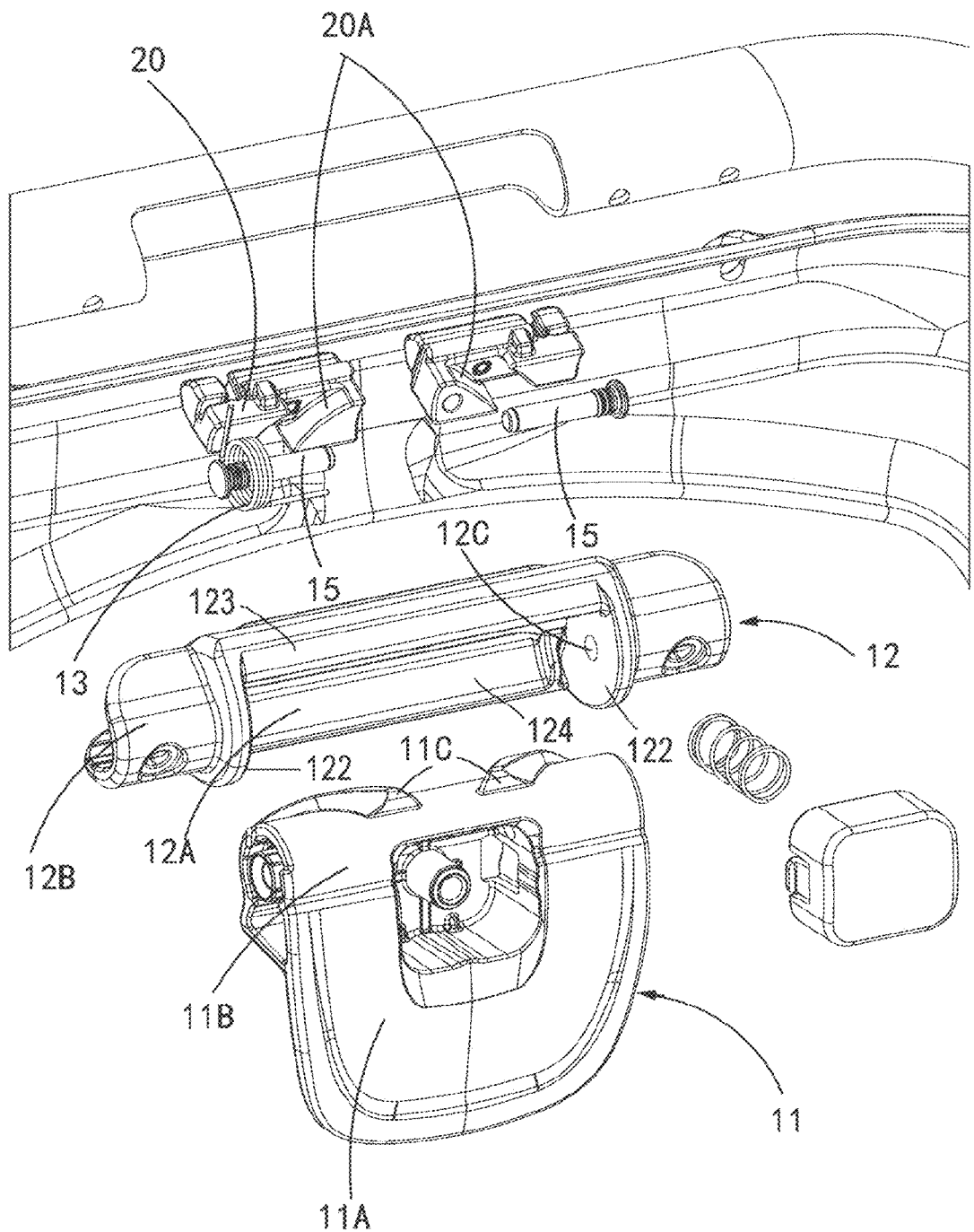
FIG. 6A is a partial enlarged view of the region R in FIG. 6.
Figure 8:
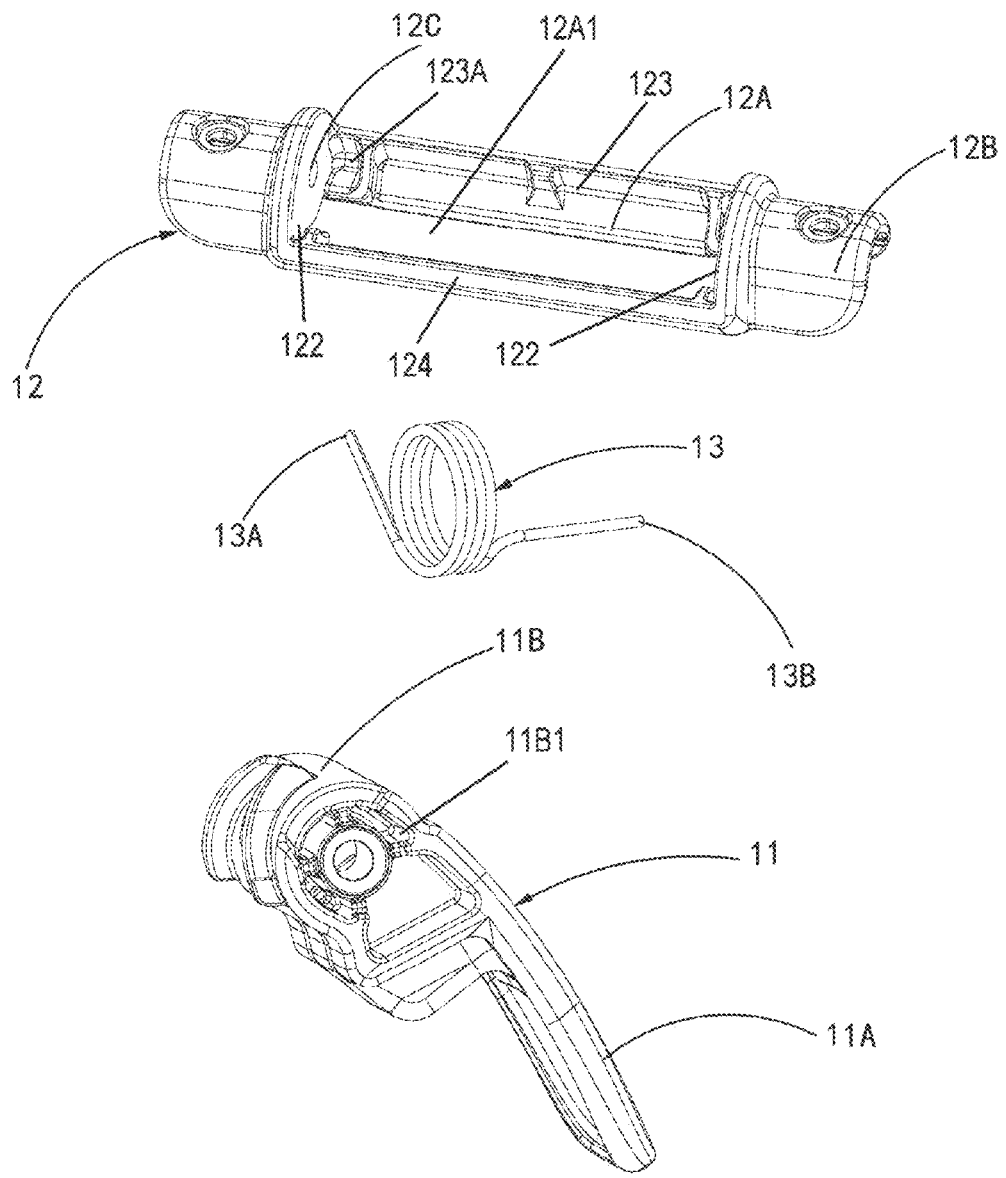
FIG. 8 is an exploded perspective view of a folding handle according to an embodiment of the disclosure.

As shown in FIGS. 6A and 8, the handle body 11 includes a pulling part 11A and a shaft part 11B located at an end of the pulling part 11A. The pulling part 11A may be in a shape of a flap or a strip, for example, such that the user's fingers can hook or pull the part to exert a force. The shaft part 11B may be in a shape of a cylinder, such that the handle body 11 can perform a pivoting motion around an axis Z of the shaft part 11B.

Figure 1:
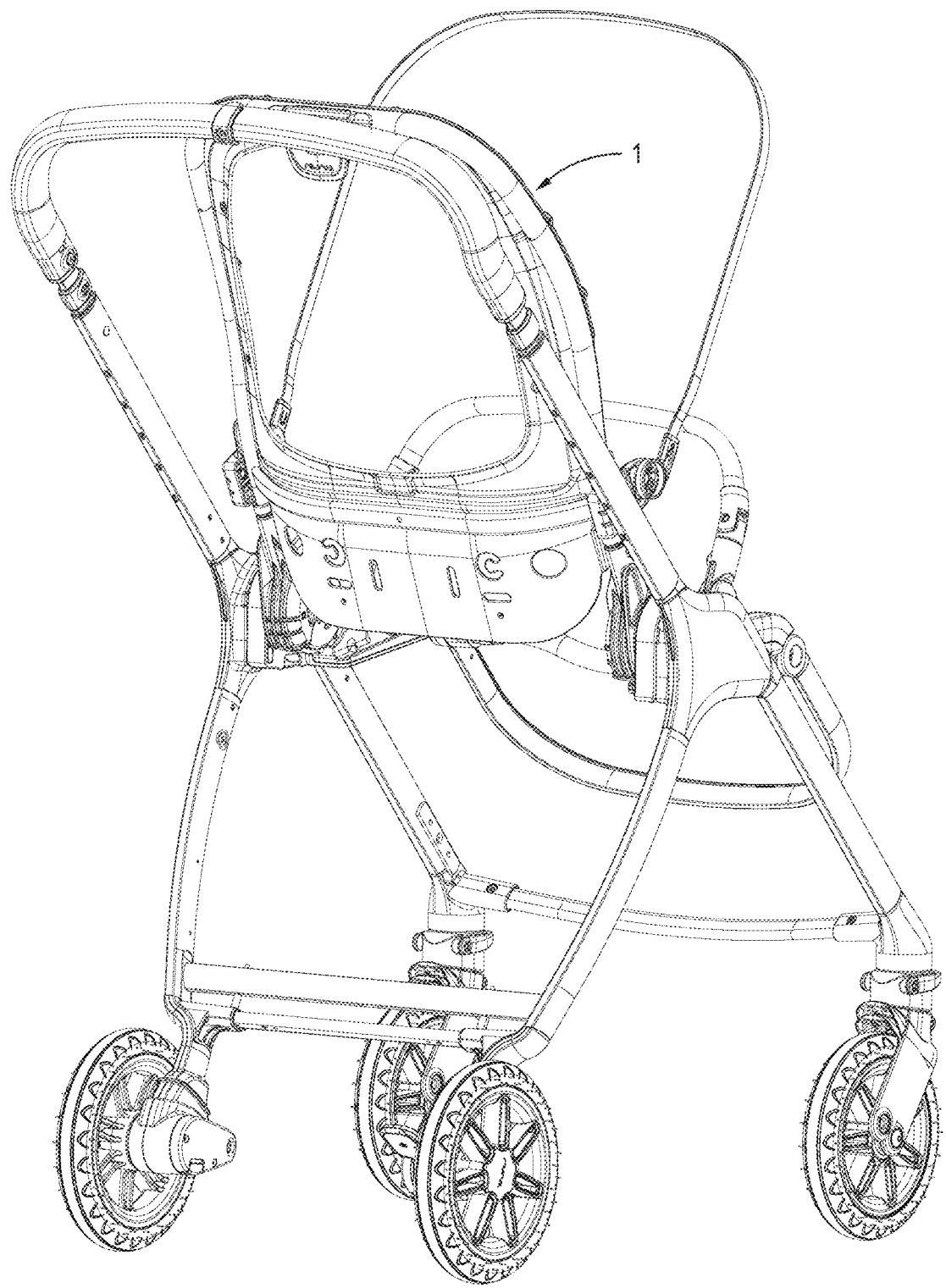
FIG. 1 is a perspective view of a child stroller in an unfolded state.
Figure 2:
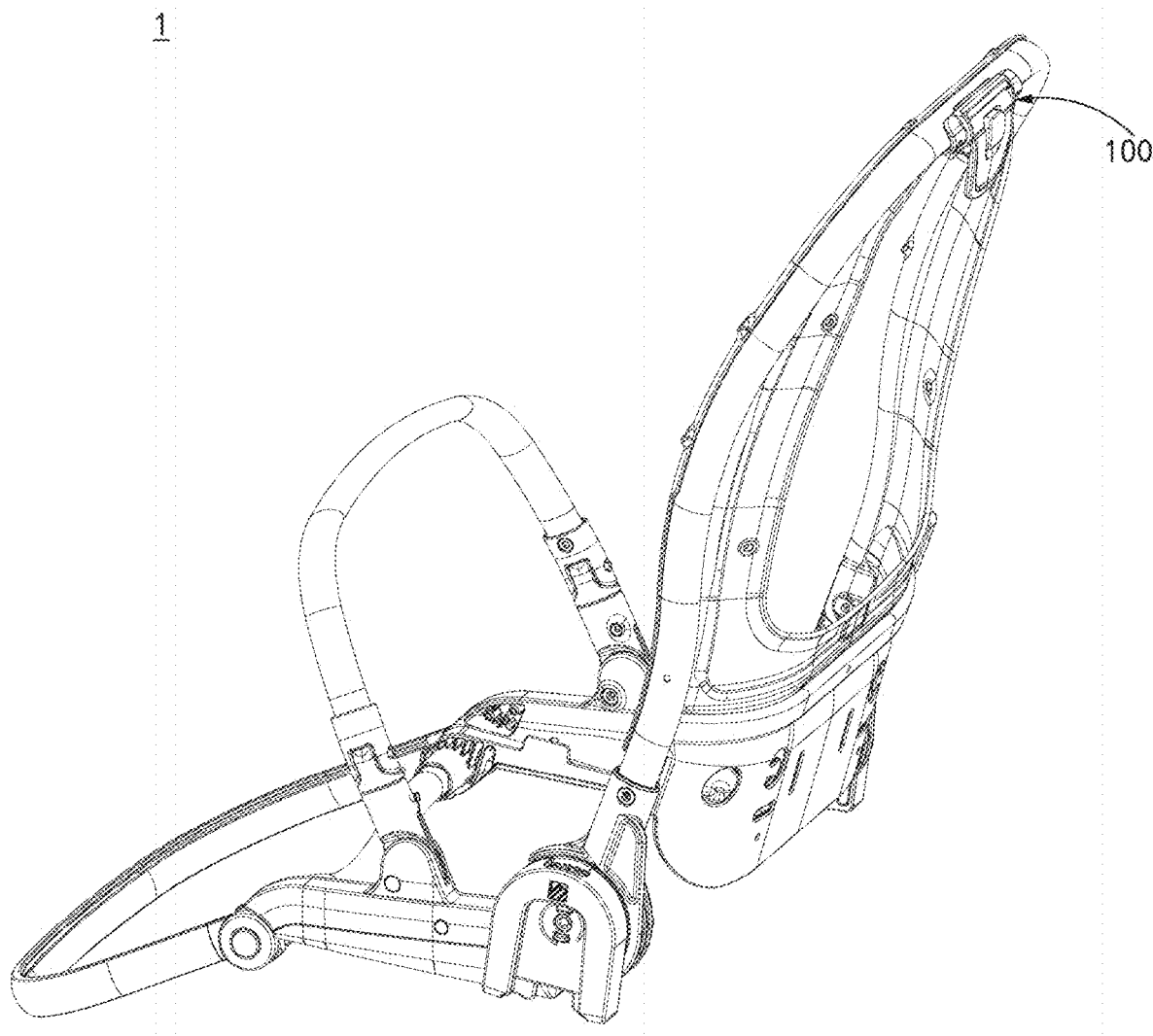
FIG. 2 is a perspective view of a child stroller seat in an unfolded state.
Figure 3:
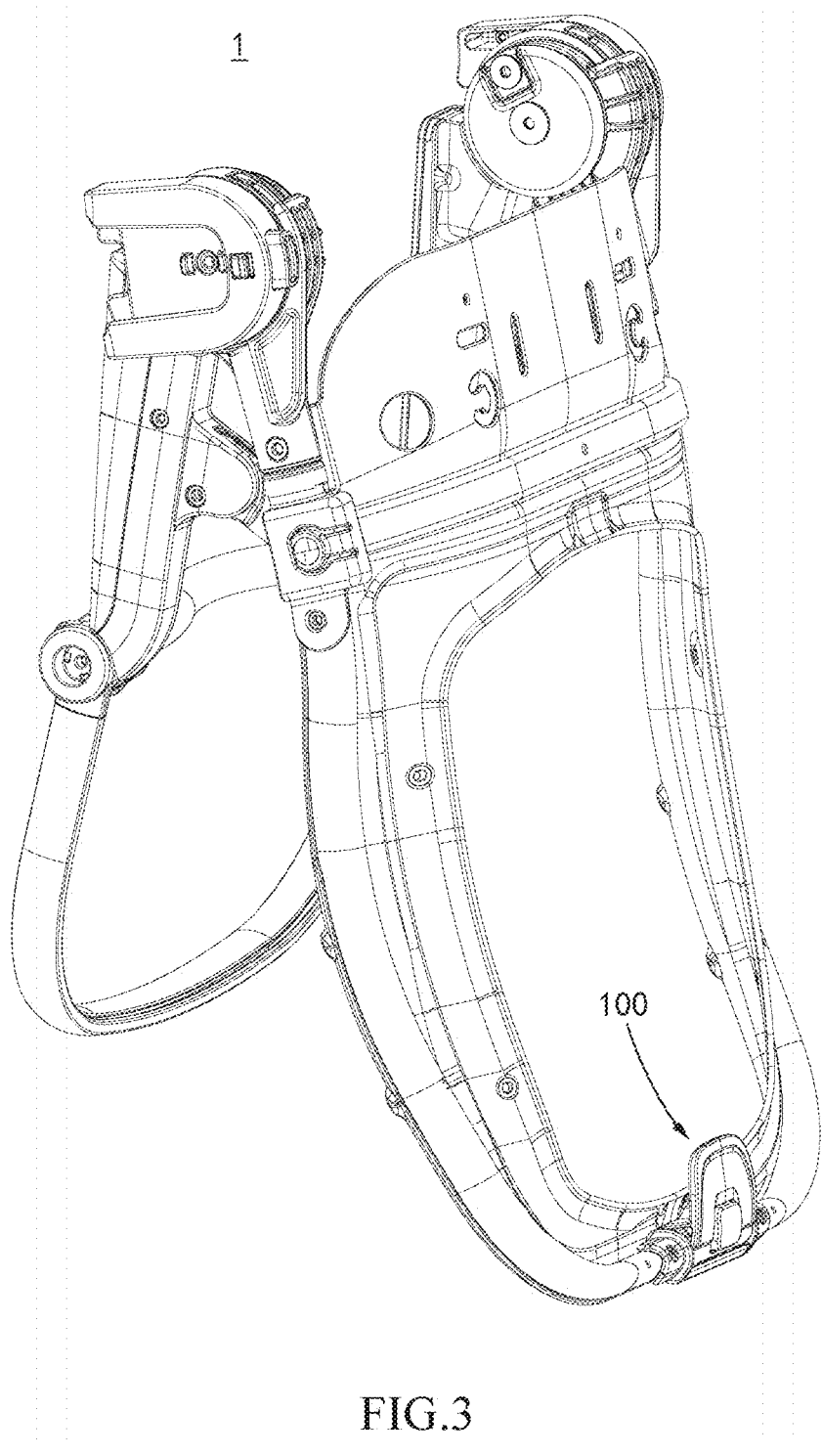
FIG. 3 is a perspective view of a child stroller seat in a folded state.
Figure 4:
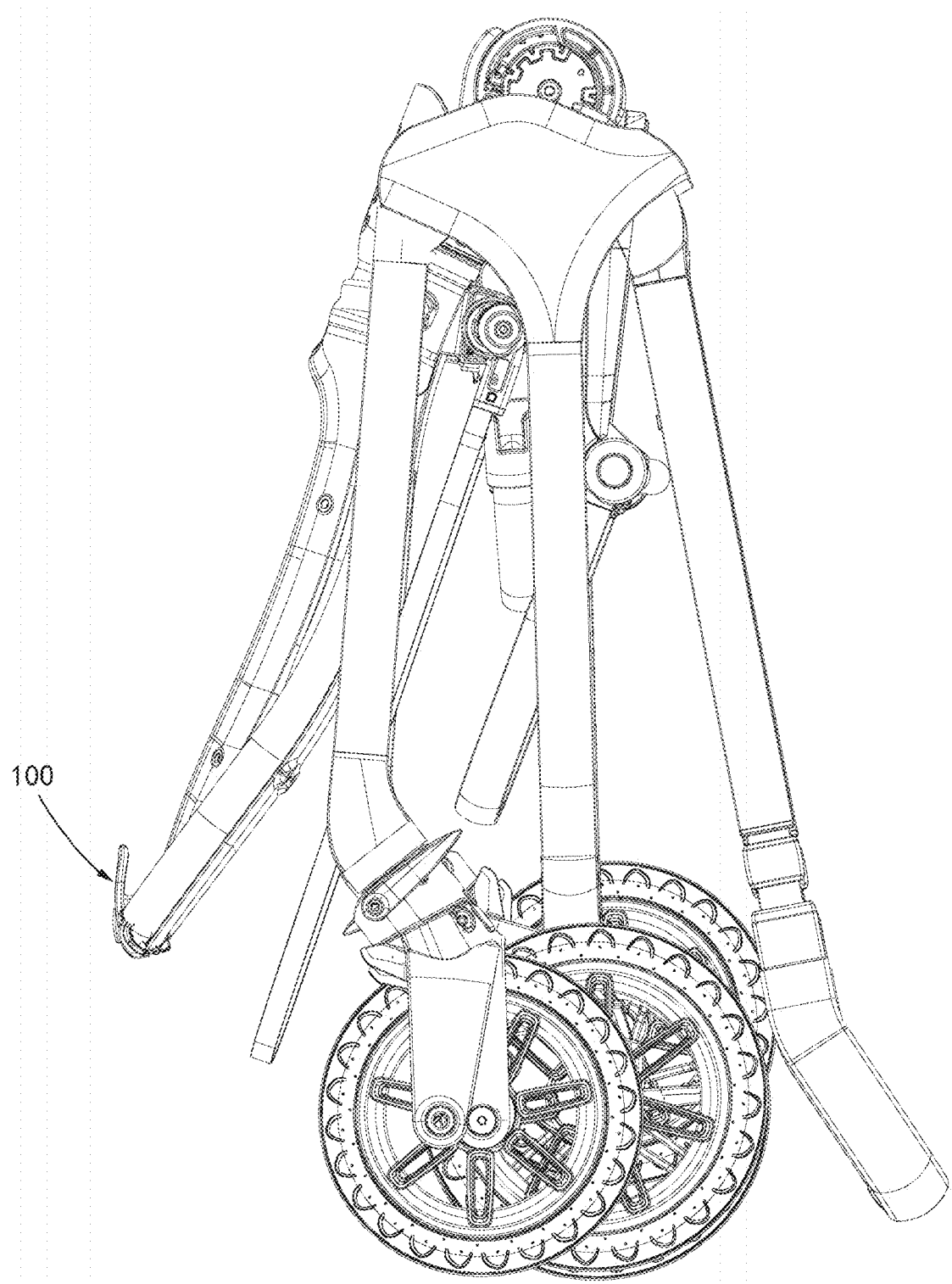
FIG. 4 is a perspective view of a child stroller in a folded state.
Figure 5:
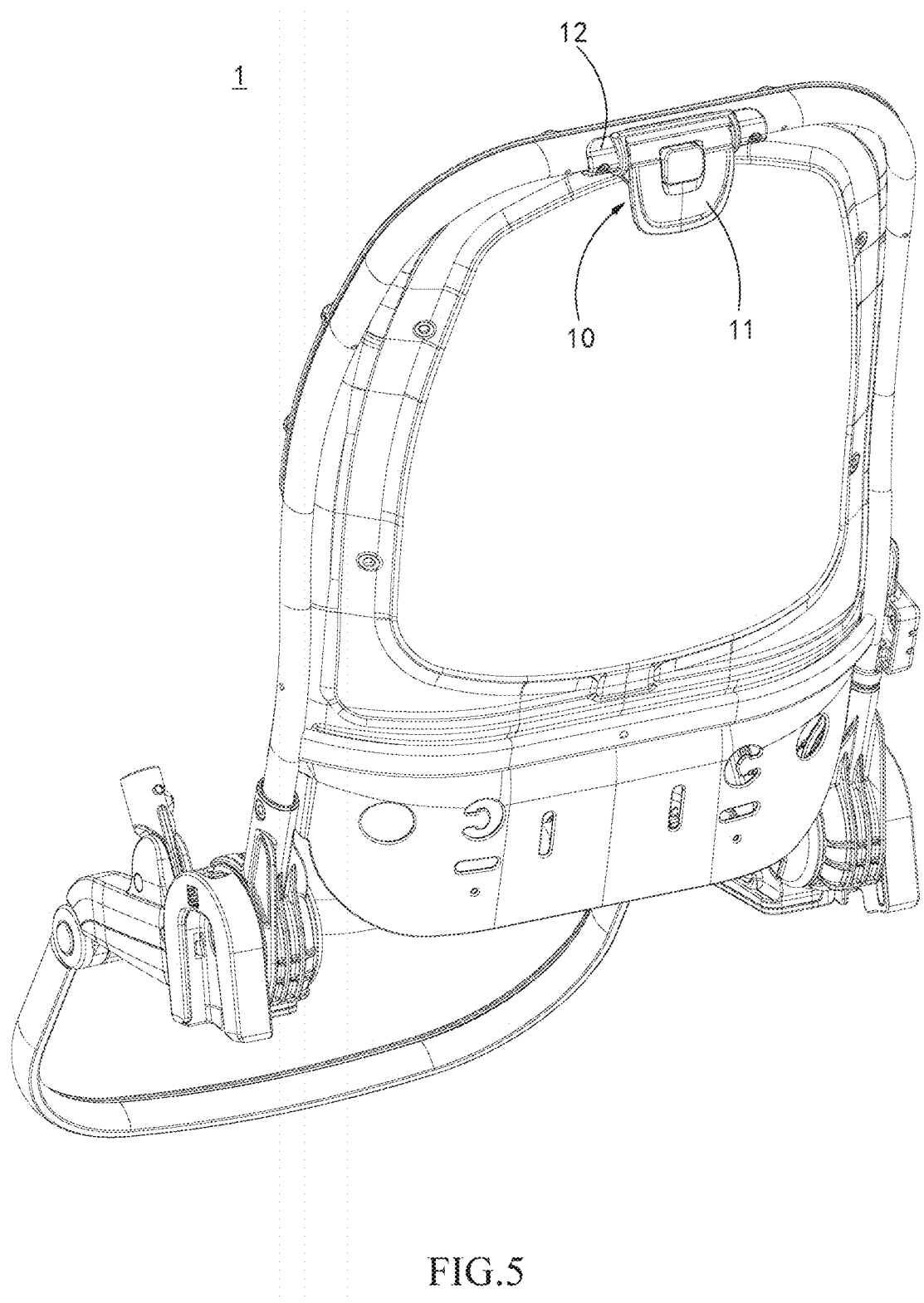
FIG. 5 shows a child stroller seat amounted with a folding handle according to an embodiment of the disclosure.

As shown in FIGS. 5, 6, and 6A, the handle connecting member 12 serves to pivotally fix the handle body 11 to the child stroller seat 1. On the one hand, the handle connecting member 12 is fixed on the child stroller seat 1, and on the other hand, the handle body 11 is pivotally connected to the handle connecting member 12 via the shaft part 11B.

The handle connecting member 12 according to the disclosure may be carried out in various embodiments, as long as it can realize the above-mentioned functions of the handle connecting member 12. In the embodiment shown in FIGS. 6A, 8 and 11, the handle connecting member 12 has a receiving cavity 12A for the shaft part 11B of the handle body 11 to be pivoted therein, and a mounting part 12B to be fixed to the child stroller seat 1. The mounting part 12B may be located at both ends or at one end of the receiving cavity 12A, and are provided with one or more mounting holes, so as to be fixed to the child stroller seat 1 by connecting members such as bolts, screws or rivets. As shown in FIG. 6A, FIG. 7, FIG. 8, and FIG. 11, the receiving cavity 12A can be partially surrounded by two end walls 122 at both ends of the handle connecting member 12 as well as an upper side wall 123 and a lower side wall 124 of the handle connecting member 12. The upper side wall 123 and the lower side wall 124 are separated from each other by a channel 12A1, and the shaft part 11B of the handle body 11 is able to pass through the channel 12A1 to drive the driver 20 to move.

In order to make the shaft part 11B of the handle body 11 be pivoted in the receiving cavity 12A of the handle connecting member 12, in an embodiment, both ends of the shaft part 11B of the handle body 11 are set to be hollow (as shown in FIGS. 6A and 8-10), and at the same time, pivot holes 12C are disposed on side walls at both ends of the receiving cavity 12A of the handle connecting member 12 (as shown in FIGS. 6A and 8-11), moreover, two pivot pins 15 respectively pass through the pivot holes 12C in the handle connecting member 12 and respectively penetrate into both ends of the shaft part 11B of the handle body 11. Thus, the shaft part 11B of the handle body 11 can be pivoted around the pivot pins 15 in the receiving cavity 12A of the handle connecting member 12.

It should be understood, the disclosure is not limited to this one embodiment. In other embodiments, the pivot holes 12C are disposed on side walls at both ends of the receiving cavity 12A of the handle connecting member 12, and pivot shafts (not shown) may be disposed at both ends of the shaft part 11B of the handle body 11, such that the pivot shafts pass through the pivot holes 12C in the handle connecting member 12; or alternatively, the pivot shafts (not shown) are disposed on the side walls at both ends of the receiving cavity 12A of the handle connecting member 12, and both ends of the shaft part 11B of the handle body 11 are set to be hollow, such that the pivot shafts penetrate into both ends of the shaft part 11B of the handle body 11. Or still alternatively, an outer surface of the shaft part 11B of the handle body 11 is closely fit in shape and size with an inner surface of the receiving cavity 12A of the handle connecting member 12, such that the shaft part 11B can be pivoted in the receiving cavity 12A, no additional pivot holes or pivot shafts are required at this time. The other embodiments can enable the shaft part 11B of the handle body 11 to pivot in the receiving cavity 12A of the handle connecting member 12.

The elastic member is a key component to realize automatically closing of the folding handle 10, and is configured to force the handle body 11 to pivot toward the closed position.

Figure 7:
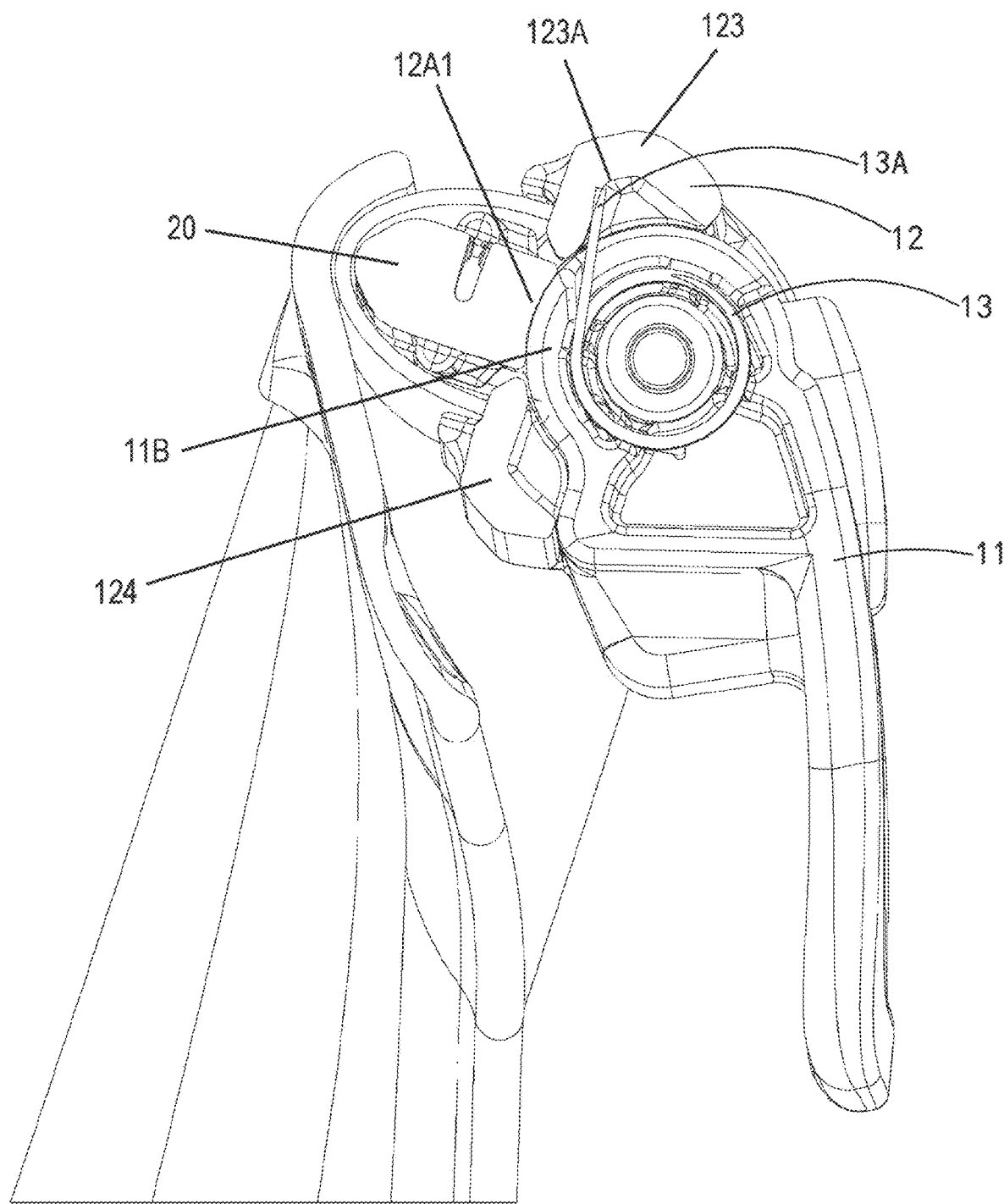
FIG. 7 is a sectional view showing a cooperation relationship of a handle body, a handle connecting member, and a torsion spring.

In the embodiment shown in FIGS. 6 to 8, the elastic member is a torsion spring 13. The torsion spring 13 has two abutting ends 13A and 13B (see FIG. 8). Among them, one abutting end 13A abuts against the handle connecting member 12, and the other abutting end 13B abuts against the handle body 11. Further, as shown in FIG. 7 and FIG. 8, the upper side wall 123 of the handle connecting member 12 is provided with a side wall abutting part 123A, and the abutting end 13A of the torsion spring 13 abuts against the side wall abutting part 123A, so that the torsion spring 13 is not easy to slide down when the shaft part 11B of the handle body 11 pivots. The shaft part 11B of the handle body 11 is provided with a fixing part 11B1, and the other abutting end 13B of the torsion spring 13 is fixed to the fixing part 11B1. The side wall abutting portion 123A can be positioned adjacent to the end wall 122 of the handle connecting member 12, so that the abutting end 13A of the torsion spring 13 can be fixed more stably. When the handle body 11 is pivoted toward an opened position by the user's force, the torsion spring 13 is compressed to generate an elastic force on the handle body 11 and the handle connecting member 12. Thus, when the handle body 11 is no longer subjected to the user's force, the elastic force of the torsion spring 13 will force the handle body 11 to pivot toward the closed position.

Figure 9:
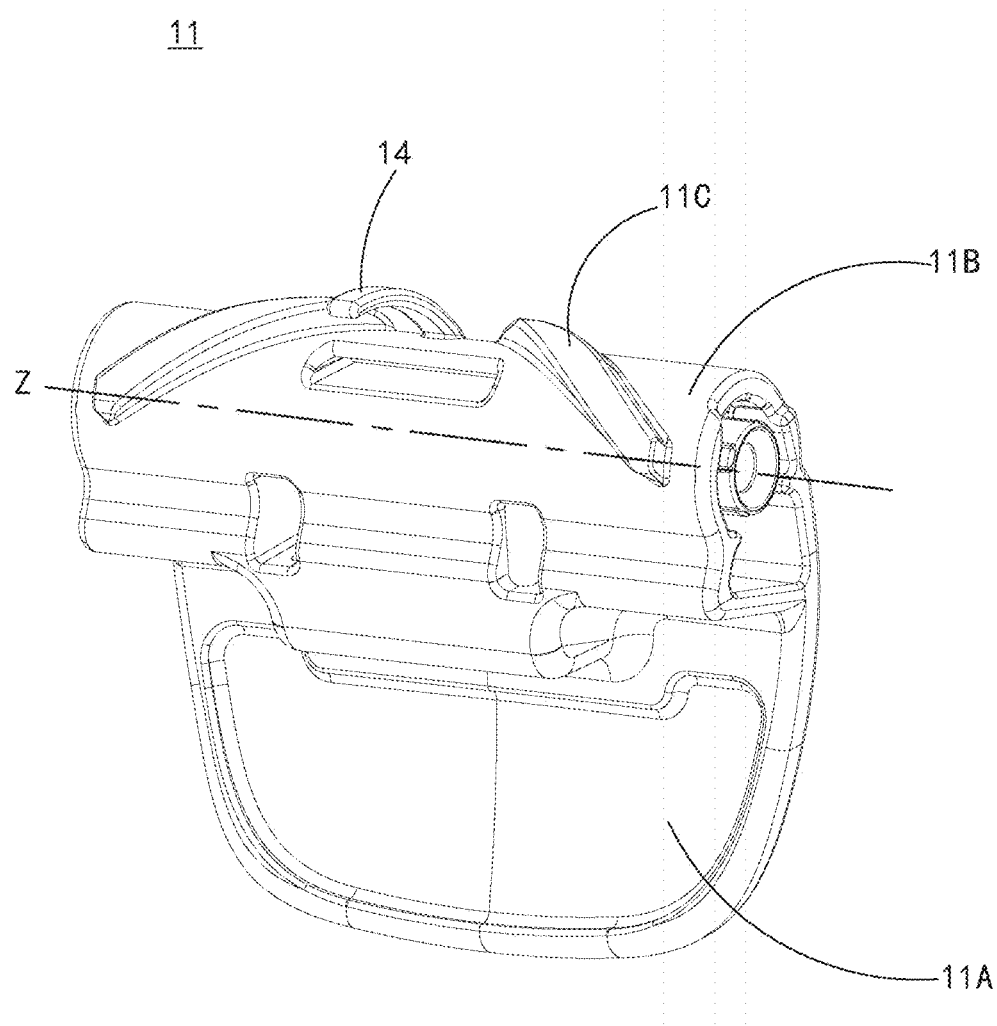
FIG. 9 is a perspective view of a handle body provided with a contact bar of a folding handle according to an embodiment of the disclosure.
Figure 10:
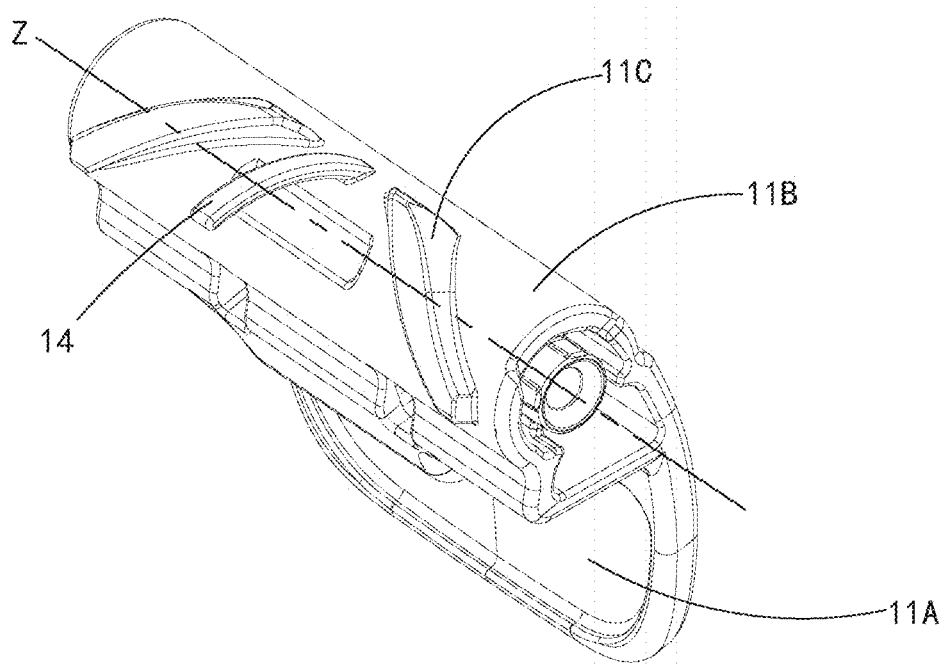
FIG. 10 is a perspective view of a handle body provided with a contact bar of a folding handle according to an embodiment of the disclosure in another angle.
Figure 11:
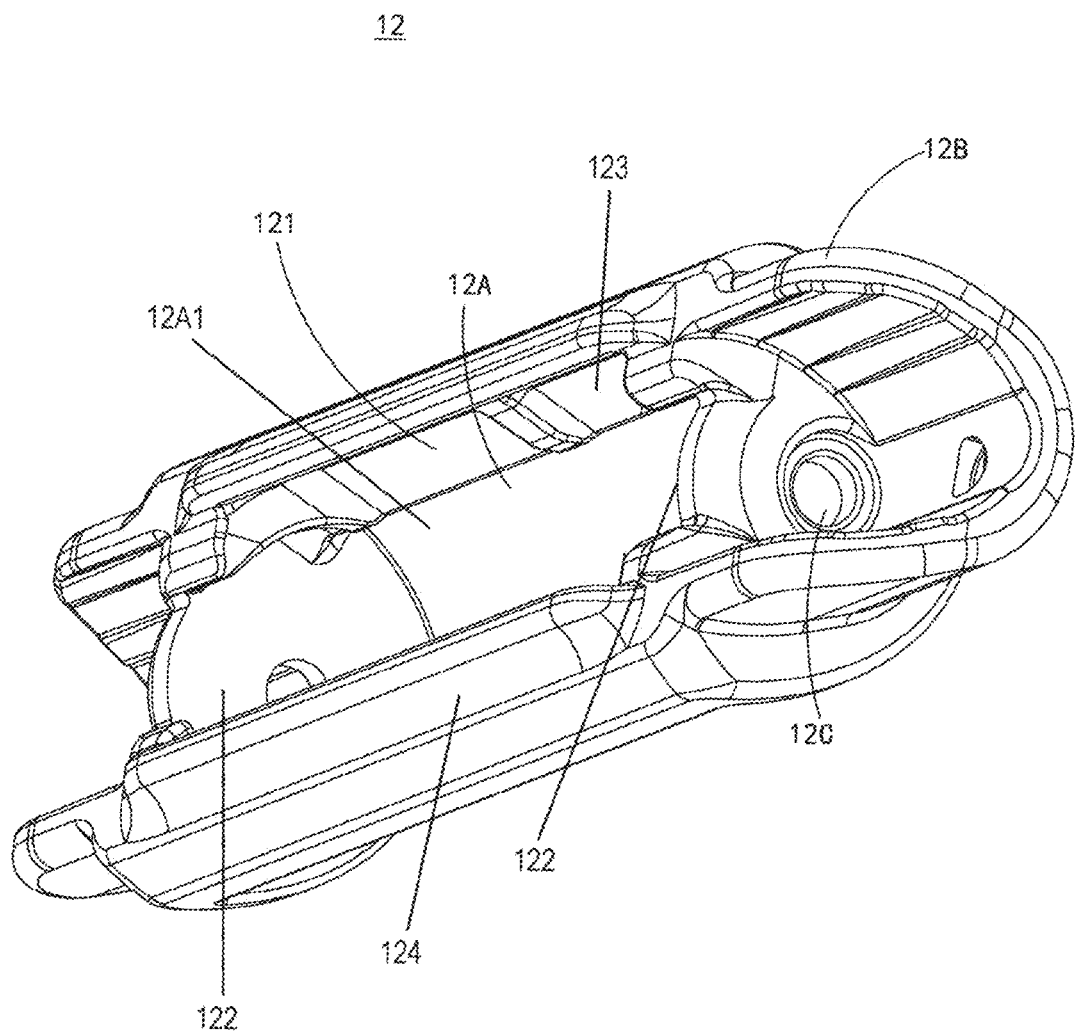
FIG. 11 is a perspective view of a handle connecting member of a folding handle according to an embodiment of the disclosure.
Figure 12:
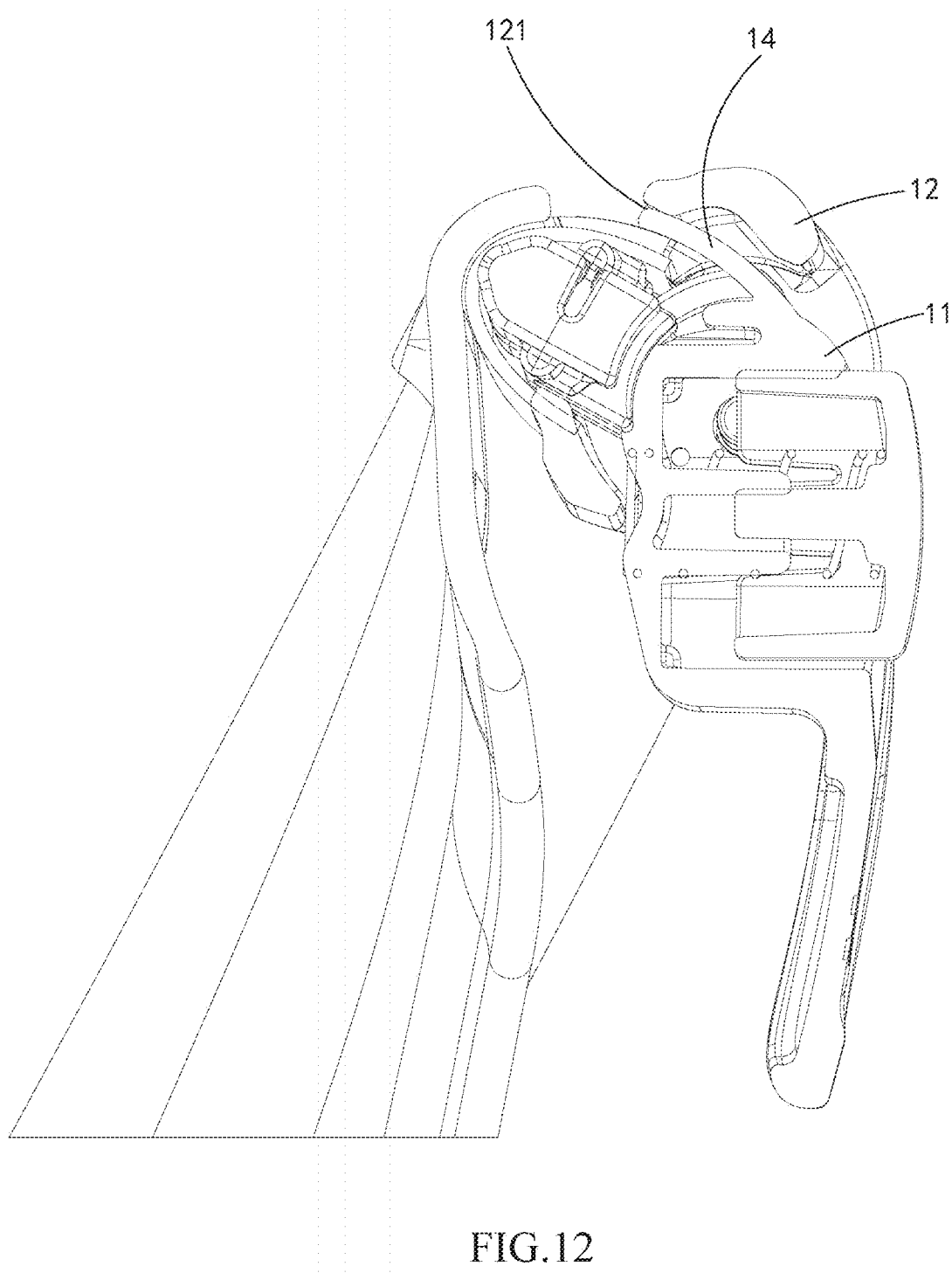
FIG. 12 is a sectional view showing a cooperation relationship of between a handle body provided with a contact bar and a handle connecting member.

In the embodiment shown in FIGS. 9, 10, and 12, the elastic member is implemented to be a contact bar 14 extending outwardly from the shaft part 11B of the handle body 11. The contact bar 14 may be pressed down by a contact surface 121 of the handle connecting member 12 to generate an elastic force (see FIGS. 11 and 12), and the elastic force of the contact bar 14 may force the handle body 11 to pivot toward the closed position. When the handle body 11 is pivoted toward the opened position under the user's force, the contact bar 14 is further pressed downward by the contact surface 121 of the handle connecting member 12 to produce a greater elastic force on the handle body 11. Thus, when the handle body 11 is no longer subjected to the user's force, the elastic force of the contact bar 14 will force the handle body 11 to pivot toward the closed position.

Of course, in addition to the above two embodiments, the disclosure may employ other forms of elastic members, such as a tensile spring or elastic rope which has one end fixed to the pulling part 11A of the handle body 11 and the other end fixed to the child stroller seat 1, thereby forcing the handle body 11 to pivot toward the closed position by the tensile spring or elastic rope.

Next, a folding device of the child stroller seat according to the disclosure will be described.

Figure 13:
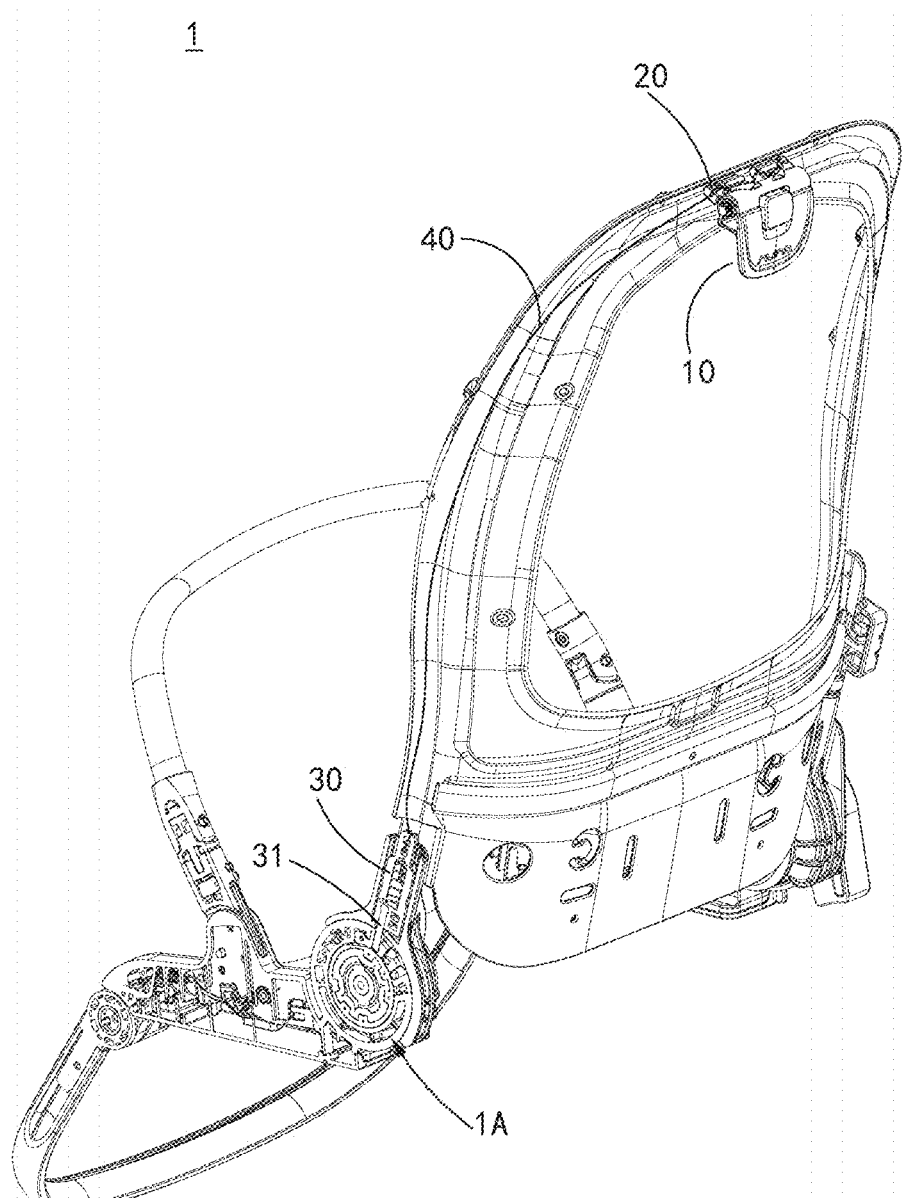
FIG. 13 is a schematic view of a child stroller seat installed with a folding device according to an embodiment of the disclosure in an unfolded state.

As shown in FIG. 13, the folding device according to an embodiment of the disclosure includes a folding handle 10, a driving member 20, a fixing member 30, and a hauling member 40.

The backrest portion and the seat portion of the child stroller seat 1 are coupled together by a pivot structure 1A, and the backrest portion and the seat portion may be pivoted in respect to each other by the pivot structure 1A. When the user pivots the backrest portion an obtuse angle in respect to the seat portion, that is, when the child stroller seat 1 is in the unfolded state to be seated by a child, in order to be held in the unfolded state, it is necessary to lock the pivot structure 1A so that it cannot be rotated. For this reason, the folding device according to the disclosure is provided with a movable fixing member 30 in the vicinity of the pivot structure 1A, and the fixing member 30 is provided with a locking pin 31. When the child stroller seat 1 is unfolded, the locking pin 31 is engaged with the pivot structure 1A of the child stroller seat 1, such that the pivot structure 1A cannot be rotated and the child stroller seat 1 is kept in the unfolded state.

On the other hand, when the user prepare to fold the child stroller seat 1 and the child stroller, the locking pin 31 needs to be disengaged from the pivot structure 1A, thereby allowing the pivot structure 1A to rotate to fold the child stroller seat 1.

In order to conveniently realize the disengagement of the locking pin 31 from the pivot structure 1A, the folding device according to the disclosure is provided with a folding handle 10, a driving member 20, and a hauling member 40. By the driving member 20 and the hauling member 40, the movement of the folding handle 10 can be transmitted to the fixing member 30, and in turn the locking pin 31 is brought to be disengaged from the pivot structure 1A, as specifically described hereinbelow.

Firstly, the folding handle 10 is set to be able to drive the driving member 20 to move. In an embodiment, a driving rib 11C inclined in respect to an axis Z of the shaft part 11B is disposed on an outer surface of the shaft part 11B of the handle body 11 of the folding handle 10 (see FIGS. 9 and 10), and the driving member 20 has a driving ramp 20A (see FIG. 6A). The driving rib 11C cooperates with the driving ramp 20A, and when the handle body 11 is pivoted toward the opened position, the driving rib 11C and the driving ramp 20A interact with each other, thereby causing the driving member 20 to move. However, the disclosure is not limited thereto, and various manners can also be adopted to enable the folding handle 10 to drive the driving member 20 to move. For example, a threaded mechanism may be disposed on the outer surface of the shaft part 11B of the handle body 11 of the folding handle 10, and the driving member 20 may adopt a worm structure cooperative with the threaded mechanism, so as to transform a pivoting motion of the folding handle 10 to a linear motion of the driving member 20.

Figure 14:
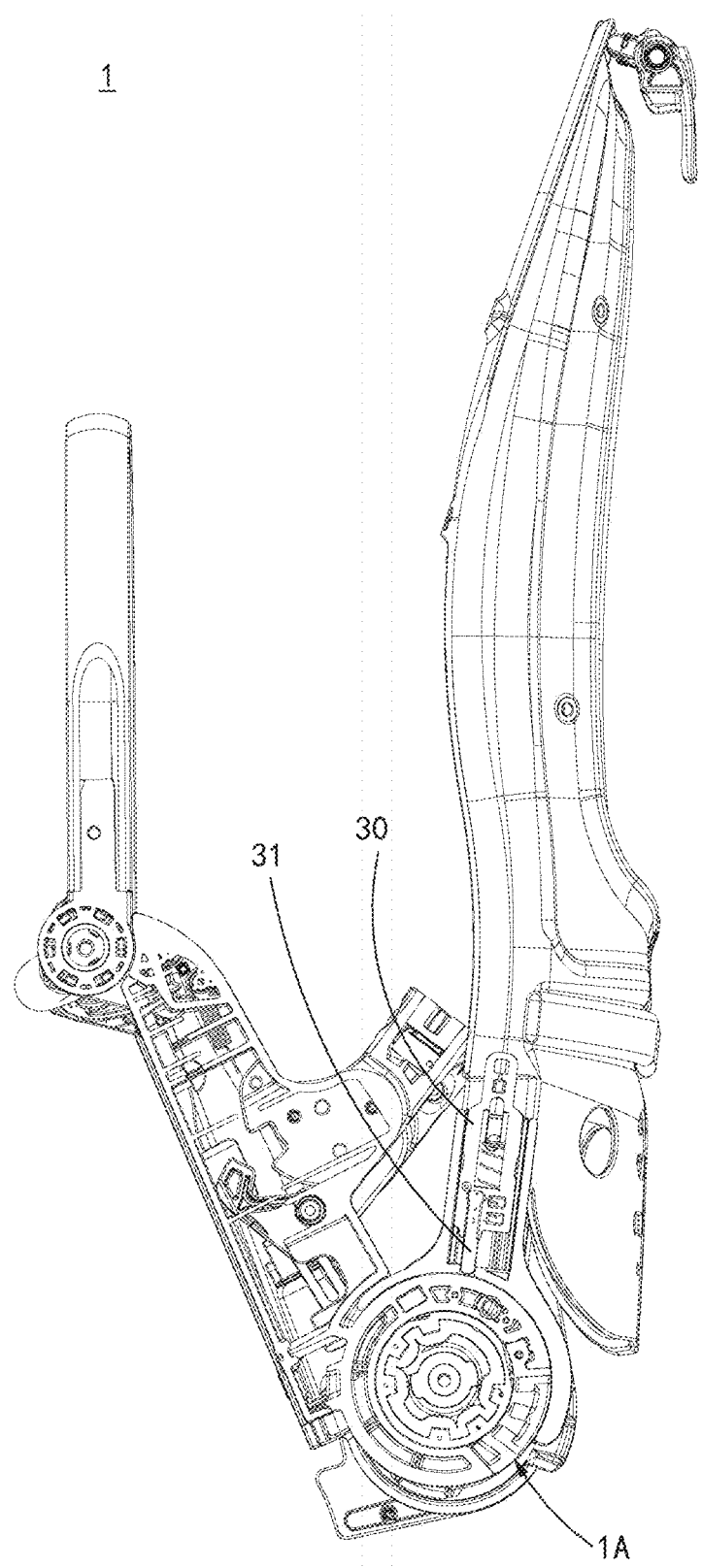
FIG. 14 is a schematic view of a child stroller seat installed with a folding device according to an embodiment of the disclosure in a folded state.

Secondly, the movement of the driving member 20 is further transmitted to the fixing member 30. In an embodiment, the hauling member 40 is connected between the driving member 20 and the fixing member 30, such that when the driving member 20 moves, the movement of the driving member 20 is transmitted to the fixing member 30 via the hauling member 40 to bring the locking pin 31 to be disengaged from the pivot structure 1A in turn, as shown in FIG. 14, thereby enabling the pivot structure 1A to rotate for folding the child stroller seat 1. Of course, the disclosure is not limited thereto, and various manners may also be adopted to transmit the movement of the driving member 20 to the fixing member 30. For example, the folding handle 10 and the driving member 20 may be disposed close to the fixing member 30, whereby the driving member 20 may be directly connected to the fixing member 30, such that the movement of the driving member 20 is directly transmitted to the fixing member 30.

When the child stroller seat 1 is in the unfolded state, the locking pin 31 is inserted into the pivot structure 1A to be engaged with it, and the movement of the locking pin 31 inserted into the pivot structure 1A causes the fixing member 30 to move, which is transmitted the driving member 20 via the hauling member 40, so as to bring the driving member 20 to move to cause the folding handle 10 to pivot toward the closed position, so the folding handle 10 will not be opened at this time.

On the contrary, when the child stroller seat 1 is folded, the pivoting motion of the folding handle 10 towards the opened position is transmitted to the fixing member 30 by the driving member 20 and the hauling member 40, and in turn brings the locking pin 31 to be disengaged from the pivot structure 1A. Afterwards, since the hauling member 40 is in a relaxed state and cannot pull the driving member 20 to move for causing the folding handle 10 to pivot toward the closed position, the folding handle 10 will remain in the open state at this time. In such case, the elastic member in the folding handle 10 according to the disclosure will play an active role to force the handle body 11 to pivot toward the closed position.

The beneficial effect of the disclosure is that the folding handle according to the disclosure can be automatically closed after the child stroller seat is folded, such that the folded child stroller is more neat and aesthetic, and potential dangers are avoided.

The foregoing embodiments and advantages are exemplary only, and should not be construed as limitations of the disclosure. The description herein is intended to be illustrative, not to limit the scope of the claims. Many alternatives, variations and modifications will be apparent to those skilled in the art. The features, structures, and other characteristics of the exemplary embodiments described herein may be combined in various ways to form additional and/or alternative exemplary embodiments.

Since the features of the disclosure can be embodied in various forms without departing from the characteristics of the disclosure, it should also be understood, the above-described embodiments are not limited to any details described above, unless otherwise noted. Rather, they should be construed broadly as falling within the scope defined by the appended claims. Therefore, all modifications and variations falling in the scope and limits of the claims, or equivalents of such scope and limits, should be covered by the appended claims.

LIST OF REFERENCE SIGNS

1: child stroller seat
1A: pivot structure
10, 100: folding handle
11: handle body
11A: pulling part
11B: shaft part
11B1: fixing part
11C: driving rib
12: handle connecting member
12A: receiving cavity
12A1: channel
12B: mounting part
12C: pivot holes
121: contact surface
13: torsion spring
13A, 13B: abutting ends
14: contact bar
15: pivot pin
20: driving member
20A: driving ramp
30: fixing member
31: locking pin
40: hauling member
122: end wall
123: upper side wall
123A: side wall abutting part
124: lower side wall
Z: axis

What is claimed is:

1. A folding device for a child stroller seat, wherein the folding device comprises:
   a folding handle including:
      a handle body comprising a pulling part and a shaft part located at an end of the pulling part;
      a handle connecting member on the child stroller seat, wherein the handle connecting member comprises a receiving cavity for the shaft part of the handle body to be pivotally accommodated therein; and
      an elastic member in the receiving cavity to force the handle body to pivot to a closed position;
   a driving member, the receiving cavity being partially surrounded by two end walls as well as an upper side wall and a lower side wall of the handle connecting member, the upper side wall and the lower side wall being separated from each other by a channel, and the shaft part of the folding handle being able to pass through the channel to drive the driving member to move;

a fixing member, being disposed in a vicinity of a pivot structure of the child stroller seat and being movable, and the fixing member comprising a locking pin, wherein when the child stroller seat is unfolded, the locking pin is engaged with the pivot structure of the child stroller seat; and a hauling member, being connected between the driving member and the fixing member, such that when the driving member moves, moving of the driving member is transmitted to the fixing member via the hauling member to bring the locking pin to be disengaged from the pivot structure.

2. The folding device according to claim 1, wherein an outer surface of the shaft part of the handle body has a driving rib inclined in respect to an axis of the shaft part, the driving member has a driving ramp, and when the handle body is pivoted toward an opened position, the driving rib and the driving ramp interact with each other.

3. The folding device according to claim 1, wherein the elastic member is a torsion spring.

4. The folding device according to claim 3, wherein one abutting end of the torsion spring abuts against the handle connecting member, and the other one abutting end of the torsion spring abuts against the handle body to force the handle body to pivot to the closed position.

5. The folding device according to claim 1, wherein the elastic member is a contact bar extending outward from the shaft part of the handle body.

6. The folding device according to claim 1, wherein the elastic member is a tensile spring or elastic rope which has one end fixed to the pulling part of the handle body and the other end fixed to the child stroller seat.

7. A child stroller, wherein the child stroller comprises a child stroller seat, the child stroller seat adopts the folding device according to claim 1.

8. The folding device according to claim 1, wherein both ends of the shaft part of the handle body are set to be hollow, pivot holes are disposed on side walls at both ends of the receiving cavity of the handle connecting member, and two pivot pins respectively pass through the pivot holes in the handle connecting member and respectively penetrate into both ends of the shaft part of the handle body.

9. The folding device according to claim 1, wherein pivot holes are disposed on side walls at both ends of the receiving cavity of the handle connecting member, and pivot shafts are disposed at both ends of the shaft part of the handle body, such that the pivot shafts pass through the pivot holes in the handle connecting member.

10. The folding device according to claim 1, wherein pivot shafts are disposed on the side walls at both ends of the receiving cavity of the handle connecting member, and both ends of the shaft part of the handle body are set to be hollow, such that the pivot shafts penetrate into both ends of the shaft part of the handle body.

11. The folding device according to claim 1, wherein the elastic member is a torsion spring, an upper side wall of the handle connecting member is provided with a side wall abutting part, and an abutting end of the torsion spring abuts against the side wall abutting part.

12. The folding device according to claim 11, wherein the side wall abutting part is adjacent to an end wall of the handle connecting member.

13. The folding device according to claim 1, wherein the elastic member is a torsion spring, the shaft part of the handle body is provided with a fixing part, and another abutting end of the torsion spring is fixed to the fixing part.

14. A folding device for a child stroller seat, wherein the folding device comprises:

a folding handle including:

a handle body comprising a pulling part and a shaft part located at an end of the pulling part;

a handle connecting member on the child stroller seat, wherein the handle body is pivotally connected to the handle connecting member via the shaft part; and an elastic member including a contact bar protruding outward from an outer surface of the shaft part of the handle body toward a contact surface of the handle connecting member, wherein the contact bar is configured to force the handle body to pivot to a closed position;

a driving member, the folding handle being able to drive the driving member to move;

a fixing member, being disposed in a vicinity of a pivot structure of the child stroller seat and being movable, and the fixing member comprising a locking pin, wherein when the child stroller seat is unfolded, the locking pin is engaged with the pivot structure of the child stroller seat; and a hauling member, being connected between the driving member and the fixing member, such that when the driving member moves, moving of the driving member is transmitted to the fixing member via the hauling member to bring the locking pin to be disengaged from the pivot structure.

15. The folding device according to claim 14, wherein the handle connecting member comprises a receiving cavity for the shaft part of the handle body to be pivoted therein and a mounting part fixed to the child stroller seat.

16. The folding device according to claim 15, wherein both ends of the shaft part of the handle body are set to be hollow, pivot holes are disposed on side walls at both ends of the receiving cavity of the handle connecting member, and two pivot pins respectively pass through the pivot holes in the handle connecting member and respectively penetrate into both ends of the shaft part of the handle body.

17. The folding device according to claim 15, wherein pivot holes are disposed on side walls at both ends of the receiving cavity of the handle connecting member, and pivot shafts are disposed at both ends of the shaft part of the handle body, such that the pivot shafts pass through the pivot holes in the handle connecting member.

18. The folding device according to claim 15, wherein pivot shafts are disposed on the side walls at both ends of the receiving cavity of the handle connecting member, and both ends of the shaft part of the handle body are set to be hollow, such that the pivot shafts penetrate into both ends of the shaft part of the handle body.

19. A child stroller, wherein the child stroller comprises a child stroller seat, the child stroller seat adopts the folding device according to claim 14.

* * * * *